United States Patent [19]

Keshav

[11] Patent Number: 5,793,768
[45] Date of Patent: Aug. 11, 1998

[54] METHOD AND APPARATUS FOR COLLAPSING TCP ACKS ON ASYMMETRICAL CONNECTIONS

[75] Inventor: Srinivasan Keshav, Berkeley Heights, N.J.

[73] Assignee: AT&T Corp, Middletown, N.J.

[21] Appl. No.: 700,709

[22] Filed: Aug. 13, 1996

[51] Int. Cl.⁶ .................................. H04J 3/06
[52] U.S. Cl. .................. 370/400; 370/241; 370/246; 370/507; 371/33; 371/41
[58] Field of Search ............ 370/400, 401, 370/402, 392, 395, 349, 236, 248, 338, 241, 246, 507, 508, 513, 517, 519; 371/41, 33

[56] References Cited

U.S. PATENT DOCUMENTS

| | | | |
|---|---|---|---|
| 5,438,614 | 8/1995 | Rozman et al. | 379/93 |
| 5,442,637 | 8/1995 | Nguyen | 371/5.5 |
| 5,519,699 | 5/1996 | Ohsawa | 370/352 |
| 5,528,595 | 6/1996 | Walsh et al. | 370/401 |

*Primary Examiner*—Dang Ton
*Assistant Examiner*—Shick Hom

[57] ABSTRACT

A method and an apparatus that improves a data transmission rate in a TCP connection having an asymmetrical path. An intermediate node transmits a predetermined number k of data packets to a destination node, and measures a time period A between transmitting the k data packets and receiving a receipt acknowledgment signal at the intermediate node indicating receipt of the k data packets at the destination node. The intermediate node then transmits to a source node k acknowledgement signals with a time interval of A/k between each acknowledgement signal.

12 Claims, 1 Drawing Sheet

METHOD AND APPARATUS FOR COLLAPSING TCP ACKS ON ASYMMETRICAL CONNECTIONS

BACKGROUND OF THE INVENTION

1. Field of the Invention

The present invention relates to the field of telecommunications. More particularly, the present invention relates to a method and apparatus for transmitting data packets over an asymmetrical connection.

2. Description of the Related Art

Presently, the data transmission rate for a TCP connection having an asymmetrical path is unnecessarily limited. FIG. 1 shows a schematic block diagram of a TCP-type connection having an asymmetrical path. Data is transmitted at relatively high speed from a data source, such as the Internet, for example, to an intermediate node, such as a router RP at a company premises, for example. From router RP, the data is transmitted at relatively high speed to a destination node, such as a remote router RH that is at the home of an employee of the company, for example. However, the reverse path, from RH to RP may be relatively low speed. In this situation, the throughput of data from the Internet source to router RH is limited to M/A, where M is the maximum packet size on the path from router RP to router RH, and A is the time taken for an ACK acknowledgment signal to be sent on the path from router RH to router RP indicating receipt of a data packet at router RH.

When a packet of size M is sent from router RP to router RH, there is a small delay, on the order of 1 ms, before an ACK is sent from router RH to router RP. If it takes A seconds until the ACK is received at router RP, then the connection is limited to a throughput of M bytes every A seconds, i.e., M/A, because the speed of the slowest link along the complete connection controls the throughput. Time A can be as short as 0.8 ms with a header compression to 3 bytes and a 28,000 bps modem, for example, or as long as 66 ms with no header compression and a 4800 bps modem, for example. Using M=1500 bytes, this translates to a range of 182 Kbps at the low end to 15 Mbps at the upper end. The rate of data transmission carried over an asymmetrical path of a TCP connection at the low end of the scale is unacceptably low.

To improve upon this, a scheme of ACK collapsing has been proposed wherein two ACK signals are queued at router RH, and the ACK signal that is generated the latest in time is transmitted back to the data source. The ACK signal that was not sent is dropped. Thus, the two ACK signals are collapsed into one ACK signal. In FIG. 1, router RP receives the collapsed ACK signal, and transmits the collapsed ACK signal to the Internet source. The source is configured in this scheme for transmitting two data packets in response to the collapsed ACK signal. When these two data packets are received by the destination node, two ACKs are collapsed into one and the collapsed ACK is transmitted back to the data source.

Steady state is reached shortly after the start of the connection (TCP slow start condition). However, the window size of the data source does not increase beyond 4, and the throughput is, at best 2M/A. The window does not expand beyond 4 because a TCP source increases its window only on receiving an ACK, and since one of the ACK signals is not received by the source, the window never doubles in size, as is required for a slow start condition.

While this scheme improves the data transmission rate for a TCP-type connection having an asymmetrical path, what is needed is a further improvement in the data transmission rate for a TCP-type connection having an asymmetrical path so that the full bandwidth of the link is utilized.

SUMMARY OF THE INVENTION

The present invention advantageously provides a method and an apparatus that further improves the data transmission rate of a TCP-type connection having an asymmetrical path, while also increasing the window size of the source to be greater than 4, fully utilizing the bandwidth of the link.

The advantages of the present invention are provided by a method and an apparatus in which an intermediate node transmits a predetermined number k of data packets to a destination node. Upon receipt of the k data packets, the destination node transmits a receipt acknowledgment signal to the intermediate node. According to the invention, the intermediate node estimates, or preferably measures, a time period A between the time that the k data packets were transmitted from the intermediate node and the time that receipt acknowledgment signal was received at the intermediate node. The intermediate node then transmits k acknowledgement signals to a source node indicating that the intermediate node is ready for receiving an additional predetermined number k of data packets. Each of the k acknowledgement signals are transmitted to the source with a time interval of A/k between each acknowledgement signal.

BRIEF DESCRIPTION OF THE DRAWING

The present invention is illustrated by way of example and not limitation in the accompanying FIG. 1 which shows a schematic block diagram of a TCP connection having an asymmetrical path.

DETAILED DESCRIPTION

Figure 1:

The present invention provides an improved data transmission rate for a TCP-type connection having an asymmetrical path, and provides an increase in a source window size greater than 4 so that the bandwidth of the link is fully utilized. In the present invention, a destination node, specifically router RH in FIG. 1, collapses ACK signals as described above. That is, when two data packets are received at router RH, two ACK signals are queued at router RH. The ACK signal that is generated the latest in time is transmitted to an intermediate node, such as router RP. The ACK signal that is not sent is dropped so that the two ACK signals are collapsed into one ACK signal. The number of ACK signals that are collapsed is not limited to 2, but can be any number that the TCP-type connection is configured to handle.

Router RP responds to the collapsed ACK signal by expanding the collapsed ACK signal into multiple ACK signals, generally speaking. In the specific case when the collapsed ACK signal received by router RP represents receipt of two data packets, router RP expands the collapsed ACK signal into two ACK signals. The two ACK signals are then transmitted to the Internet source.

Preferably, when router RP receives an ACK signal, the ACK is checked for whether the ACK signal contains a message requesting retransmission of a particular packet. If so, router RP passes the ACK signal through to the data source. Otherwise, for each ACK signal that router RP receives, multiple ACK signals are transmitted. That is, one ACK signal is transmitted to the data source by the intermediate node for each ACK signal contained in the collapsed ACK transmitted by the destination node.

If the last ACK signal that router RP transmitted was for byte X, and the new ACK signal is for byte Y, router RP sends (Y-X)/M ACK signals to the data source with appropriate values in the ACK header, and where M is the maximum packet size. If Y<X, that is, the ACK signal is a request for retransmission of a packet, router RP does not expand the collapsed ACK signal, but passes the ACK signal on to the data source for retransmission of the requested data packet.

By expanding collapsed ACK signals at router RP, the window size of the source is allowed to grow beyond 4. Nevertheless, when the window size is large, the situation exists that the source may receive many ACK signals grouped together, and responds by sending a burst of data packets in the forward direction. This can cause packet losses and congestion.

To avoid this situation, router RP preferably clocks out the expanded ACK signals. One way to do this is to estimate the rate at which packets are being transmitted on the forward path to the destination. Router RP then transmits expanded ACK signals back to the source at a rate corresponding to the estimated rate. Another way is to preferably measure the time between receiving packets on the slow link, i.e., time period A. When router RP receives a collapsed ACK signal that is to be expanded to k ACKs, it transmits k expanded ACKs, each spaced A/k seconds apart in time. If a timer is unavailable or the expense for a timer is prohibitive at router RP, router RP can simply send a ACKs, each spaced αA/k apart in time. This restricts transmission bursts from the data source to be of length α times the maximum packet size of the data packets, that is, αM.

While the present invention has been described in connection with the illustrated embodiments, it will be appreciated and understood that modifications may be made without departing from the true spirit and scope of the invention.

What is claimed is:

1. A method of communicating data packets over an asymmetrical connection comprising:

transmitting a predetermined number k, an integer, of data packets from a source node;

receiving the predetermined number k of data packets at an intermediate node;

transmitting the predetermined number k of data packets from the intermediate node;

receiving the predetermined number k of data packets at a destination node;

transmitting a receipt acknowledgment signal from the destination node to the intermediate node when the predetermined number of data packets are received at the destination node;

receiving the receipt acknowledgement signal at the intermediate node;

estimating a time period A between the step of transmitting the predetermined number of data packets from the intermediate node and the step of receiving the receipt acknowledgment signal at the intermediate node; and transmitting the predetermined number k of acknowledgement signals from the intermediate node to the source node with a time interval of A/k between each acknowledgement signal when the receipt acknowledgement signal is received by the intermediate node.

2. The method according to claim 1, wherein the step of estimating the time period A includes the step of measuring the time period A.

3. The method according to claim 2, wherein the step of receiving the receipt acknowledgement signal at the intermediate node includes the steps of:

determining whether the receipt acknowledgement signal requests retransmission of one of the predetermined number k of data packets; and transmitting the receipt acknowledgment signal to the source node when the receipt acknowledgement signal requests retransmission of one of the predetermined number k of data packets.

4. The method according to claim 3, wherein the predetermined number k of data packets are transmitted and received using a transmission control protocol TCP connection.

5. The method according to claim 4, wherein the intermediate node is a router.

6. The method according to claim 1 includes transmitting a predetermined number α, an integer, acknowledgement signals spaced αA/k apart in time.

7. An apparatus for transmitting data packets over an asymmetrical connection, the apparatus comprising:

an intermediate node receiving a predetermined number k, an integer, of data packets, upon receipt, the intermediate node transmitting the predetermined number k of data packets; and a destination node receiving the predetermined number k of data packets transmitted by the intermediate node, and transmitting a receipt acknowledgment signal to the intermediate node when the predetermined number of data packets are received, the intermediate node estimating a time period A between transmitting the predetermined number of data packets from the intermediate node and receiving the receipt acknowledgment signal at the intermediate node, and transmitting the predetermined number k of acknowledgement signals with a time interval of A/k between each acknowledgement signal indicating that the intermediate node is ready for receiving an additional predetermined number k of data packets.

8. The apparatus according to claim 7, wherein the intermediate node measures the time period A.

9. The apparatus according to claim 8, wherein the intermediate node determines whether the receipt acknowledgement signal requests retransmission of one of the predetermined number k of data packets, and transmits the receipt acknowledgment signal requesting retransmission of one of the predetermined number k of data packets.

10. The apparatus according to claim 9, wherein the predetermined number k of data packets are transmitted and received using a transmission control protocol TCP connection.

11. The apparatus according to claim 10, wherein the intermediate node is a router.

12. The apparatus according to claim 7, wherein the intermediate node transmits a predetermined number α, an integer, acknowledgement signals spaced αA/k apart in time.

* * * * *